United States Patent [19]
Redgrave et al.

[11] Patent Number: 5,957,250
[45] Date of Patent: Sep. 28, 1999

[54] BRAKE SHOE ASSEMBLY FORMED USING HOT STAKING METHOD

[75] Inventors: Christopher A. Redgrave, Portage; Michael L. Silvasi, Kalamazoo; Ralph W. Larson, Oliver, all of Mich.; Steven T. Renaud, Tecumseh; Larry F. Koscielski, LaSalle, both of Canada

[73] Assignee: Sanford Acquistion Company, Bingham Farms, Mich.

[21] Appl. No.: 08/986,262

[22] Filed: Dec. 5, 1997

Related U.S. Application Data

[62] Division of application No. 08/294,120, Aug. 22, 1994, Pat. No. 5,695,026.

[51] Int. Cl.$^6$ .................................................. F16D 69/00
[52] U.S. Cl. ................................. 188/250 D; 228/136
[58] Field of Search ........................... 188/250 D, 250 B; 228/136

[56] References Cited

U.S. PATENT DOCUMENTS

| | | | |
|---|---|---|---|
| 2,541,253 | 2/1951 | House | 188/250 D |
| 2,948,360 | 8/1960 | Lupton | 188/250 D |
| 2,964,142 | 12/1960 | Geopfrich | 188/250 D |
| 3,265,166 | 8/1966 | Lavengood | 188/250 D |
| 4,514,613 | 4/1985 | Hill et al. | 188/250 D |
| 5,503,256 | 4/1996 | Redgrave et al. | 188/250 D |

FOREIGN PATENT DOCUMENTS

349497A2  1/1990  United Kingdom.

*Primary Examiner*—Matthew C. Graham
*Attorney, Agent, or Firm*—Longacre & White

[57] ABSTRACT

A brake shoe assembly is formed by precision stamping a net shaped web blank having a series of tabs projecting outward therefrom and stamping a corresponding table member provided with tab receiving apertures and bending the table member into a semi-cylindrical segment. The web blank and the table are assembled causing the web tabs and table apertures to be interlocked securely locating the parts temporarily prior to the cooperating tabs and apertures being permanently joined together using a hot staking process without any portion thereof extending substantially beyond the outer semi-cylindrical surface of the table.

6 Claims, 4 Drawing Sheets

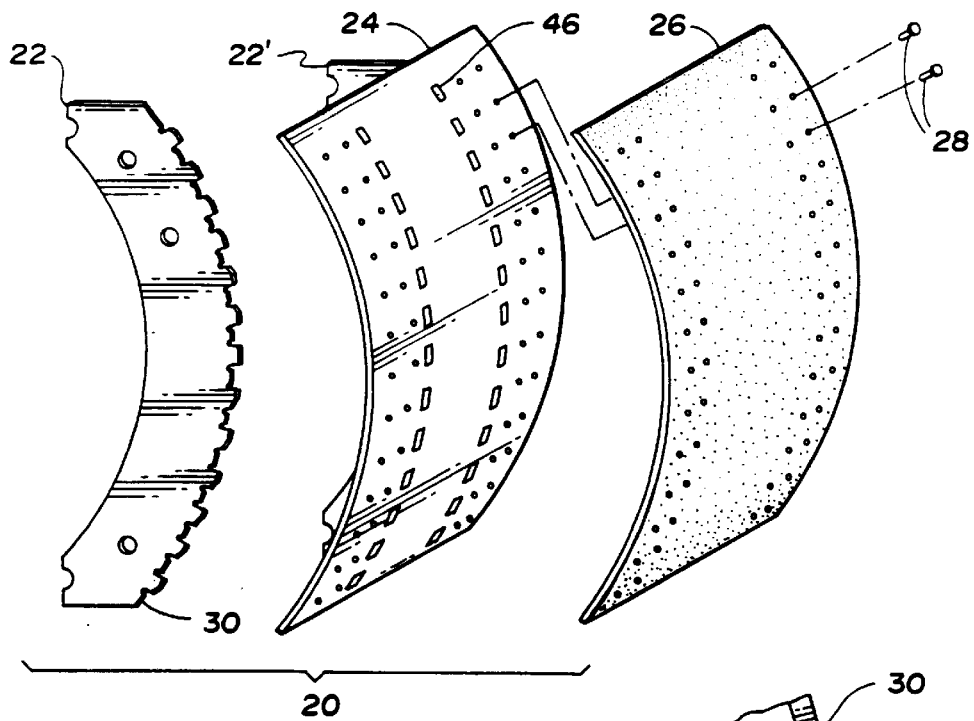
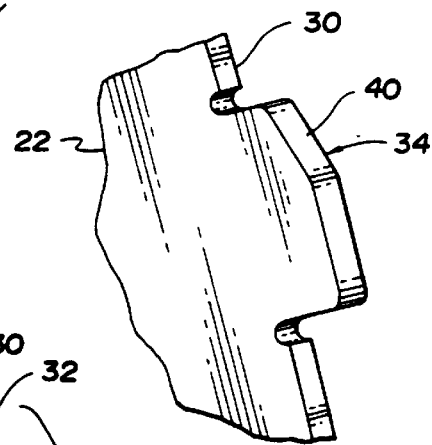
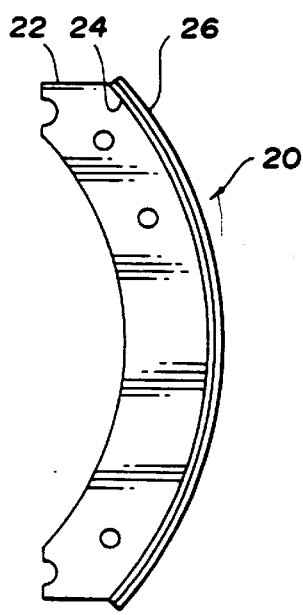
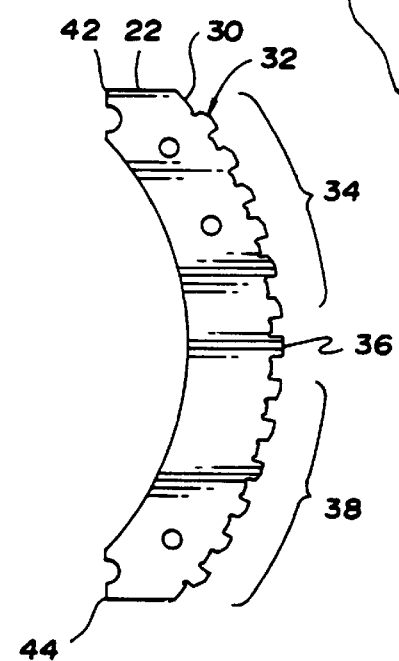

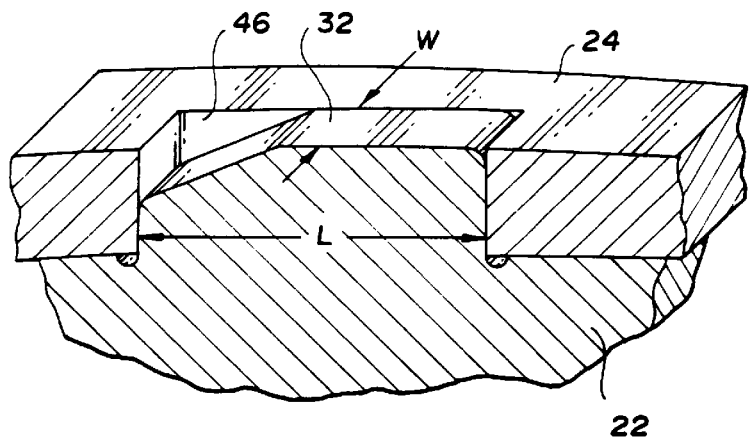
Fig. 7
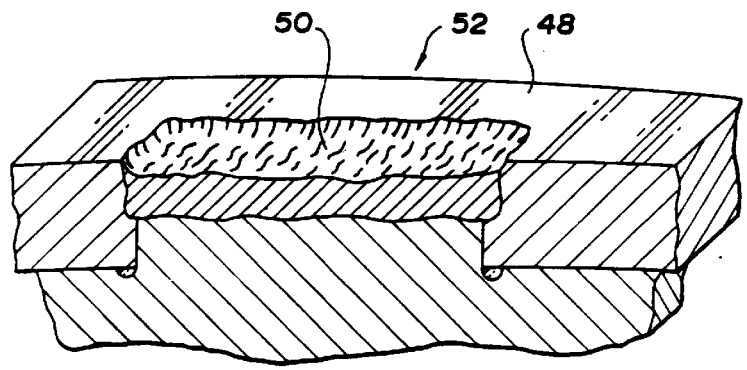
Fig. 8
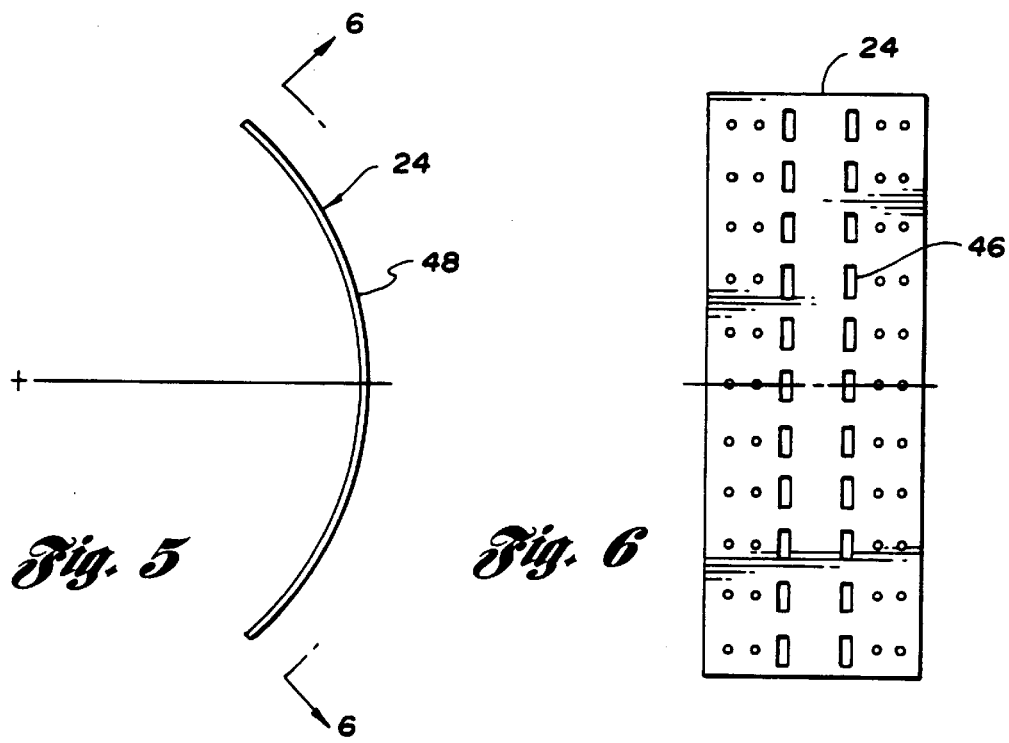
Fig. 5
Fig. 6

BRAKE SHOE ASSEMBLY FORMED USING HOT STAKING METHOD

This is a divisional of application Ser. No. 08/294,120 filed on Aug. 22, 1994 now U.S. Pat. No. 5,695,026.

TECHNICAL FIELD

The present invention relates generally to brake shoes for use in motor vehicle rotary drum brakes and more particularly to a method for enhanced reliability and cost effective manufacture thereof.

BACKGROUND ART

Rotary drum brakes are commonly used in motor vehicles, from everyday passenger cars to trucks and large off-road industrial vehicles. A rotary drum brake mechanism has two major frictionally cooperating parts; a rotary drum which is typically affixed to the vehicle wheel and a pair of brake shoes mounted on a support plate carried by the vehicle's suspension. In order to brake a wheel and the associated brake drum, the brake shoes are shifted by an actuator relative to the support plate to cause the frictional surface on the outer periphery of the brake shoes to engage the cylindrical surface of the brake drum. The resulting braking force is transmitted through the brake shoes to the vehicle suspension via the support plate, "spider", carrying the brake shoes.

As a result of wear, it is necessary to periodically replace the brake shoes and/or the frictional material provided thereon. Due to the large number of brake shoes typically required in a motor vehicle, and as a result of the necessity to periodically replace or rebuild brake shoes, it is highly desirable to minimize the cost of brake shoe assembly. Due to the safety aspects of the brake, enhanced reliability is also very desirable. Brake shoes, however, are required to provide a very strong structure having precisely defined surfaces for mounting the brake shoes on the plate and the associated brake actuator.

Brakes shoes are typically formed in generally symmetrical pairs, with each shoe having a semi-cylindrical outer surface covered with a friction material. The friction material is typically mounted on a table member metal plate formed into a semi-cylindrical shape generally corresponding to the contour of the associated brake drum. Radially inboard and securely affixed to the table member is one or more web members, typically a stamped steel plate forming an arcuate segment having a pair of ends. The ends of the brake shoe webs cooperate with the brake actuator and a stationary support pin affixed to the support plate enabling the brake actuator to simultaneously bias the two brake shoes into engagement with the brake drum when desired.

In the case of heavy duty brake shoes, the manufacturing process involves the attachment of web and table members by means of a high energy joining process. This process (typically welding) produces considerable distortion of the web and table members, due to the heat involved in the welding process. To mitigate this distortion, which is deleterious to the function of the brake, it is necessary to perform a re-strike (coining) operation to the shoe. This process reforms the cylindrical outer surface of the shoe. However, this process also changes the location of the shoe web first and second ends that are used in operation of the brake. Therefore, it is necessary to machine the shoe web first and second ends to create accurate location points relative to the outer surface of the shoe. Additionally, in conventional processes, it is commonly necessary to machine these ends to create a finished surface as the rough edged web stampings are not adequate for this purpose.

It is the primary object of this invention to minimize or eliminate the need for post assembly processing of the brake shoe assembly, thereby reducing the total cost of manufacturing said shoes. It is also the intent of this invention to improve the reliability and durability of the shoe which will add value to the end user of the brake shoe.

SUMMARY OF THE INVENTION

Accordingly, a brake shoe assembly of the present invention is formed by stamping a near net-shaped web blank of generally arcuate shape having first and second ends and an outer semi-cylindrical edge. The outer edge of the web blank is provided with a plurality of upstanding tabs extending radially outward therefrom. A table member is similarly formed having a semi-cylindrical shape corresponding contoured to the semi-cylindrical edge of the web and provided with a plurality of apertures corresponding in size and location to the upstanding tabs of the web blank. The tabs and apertures facilitate temporary attachment of the web blank and table member to maintain precise alignment therebetween while a permanent attachment is being formed. The table member and webs are permanently attached together by permanently joining the web blank and table at the intersections of the plurality of the web blank tabs and corresponding table apertures. The joint is formed using a hot staking process so that the material from the joint does not extend beyond the outer semi-cylindrical surface of the table member. The table and web are thereby securely joined together without the need of post-joining processing of the table member semi-cylindrical outer surface or the web blank first or second ends.

The tabs also enhance reliability of the structure by transmitting the forces induced by braking to the web directly, rather than through a weld.

BRIEF DESCRIPTION OF THE DRAWINGS

FIG. 1 is an exploded perspective view of a brake shoe assembly;

FIG. 2 is a side elevational view of a brake shoe assembly;

FIG. 3 is a side elevational view of a web blank;

FIG. 4 is an enlarged perspective view of a web blank illustrating a representative upstanding tab;

FIG. 5 is a side elevational view of a brake shoe table member;

FIG. 6 is a plan view of a table member in a flat state taken along line 6—6 of FIG. 5;

FIG. 7 is an enlarged cutaway perspective view of a cooperating tab and aperture temporarily joined together;

FIG. 8 is an enlarged cutaway view of a cooperating tab and aperture which have been welded together;

BEST MODE FOR CARRYING OUT THE INVENTION

Figure 9:
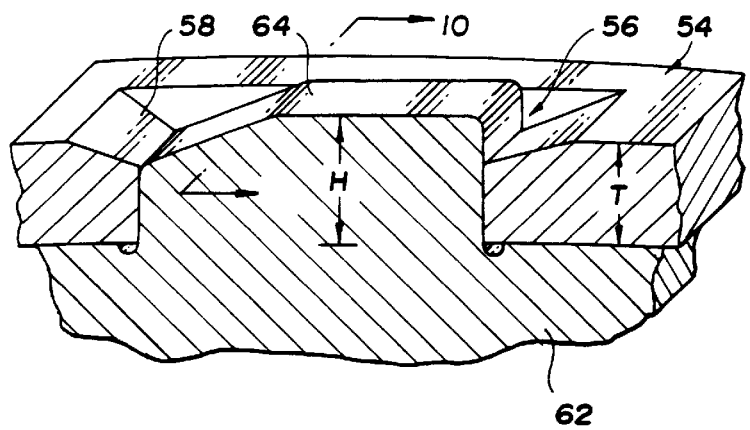
FIG. 9 is an enlarged cutaway perspective view of an alternative embodiment of a tab and aperture temporarily joined together.

FIG. 1 illustrates an exploded perspective view of a typical brake shoe assembly 20 of the present invention. Brake shoe 20 is made up of a pair of web blanks 22 and 22', a table member 24, a layer of friction material 26 and fasteners 28. Web blank 22 has a semi-circular outer peripheral edge 30 provided with a plurality of spaced apart tabs 32 projecting radially outward therefrom. In the preferred embodiment illustrated, there are three slightly different tab geometries corresponding to first series of tabs 34, center tab 36 and second series of tabs 38. Center tab 36 is generally rectangular in side elevation. First and second series of tabs 34 and 38 are provided with a ramp surface. In the case of the first series of tabs, the ramp surface is located on the corner of the tab nearest the first end 42 of web blank 22. The second series of tabs 38 is provided with a ramp surface located on the corner of the tab nearest second end 42 of the web blank as illustrated in FIGS. 3 and 4. Tabs 32 are sized to fit within the series of rectangular apertures 46 formed in table 24 as illustrated in FIG. 1 and FIG. 6.

In the embodiment of the invention illustrated which is provided with a pair of transversely spaced web blanks, two corresponding transversely spaced apart rows of rectangular apertures are formed in the table 24 as shown in FIG. 6. The tabs on web blank 24 are of the appropriate size and orientation relative to apertures 46 to facilitate the insertion of the tabs within the apertures as illustrated in FIG. 7. The ramp surface 40 located on the first and second set of tabs 34 and 38 aid in the insertion of the tabs in the corresponding aperture. Once temporarily assembled, the tabs and apertures serve to precisely locate the webs and table prior to the permanent joining thereof. Tabs and corresponding apertures can be joined by any low heat, low distortion process. The geometry of the tab and corresponding aperture vary slightly depending upon the method of permanent joining. As can be seen by comparing FIGS. 7 and 9, a tab 64 intended to be staked has a greater height than "H" than a tab 32 intended to be welded. Regardless of the method of permanent affixation of the web and table, the resulting joint does not substantially protrude beyond the outer semi-cylindrical surface 48 defined by table 24, and the tab function is equivalent irrespective of process.

In order to achieve the full benefit of the present invention, it is preferred that the web member and the table member both be stamped to their desired net shape as a result of the net forming and the low heat, low distortion joining process. The resulting assembly can therefore be used without any post-assembly machining of either the outer semi-cylindrical surface 48 or the first and second ends 42 and 44 of the web blank.

In order to control the geometric tolerances of the web blanks and table, the parts are formed using a precision stamping process in which dimensional tolerances are closely regulated. As an alternative to a single stage of precision stamping die, a multiple stage of progressive stamping operation, fine blanking process or similar means can be utilized to carefully control the profile of the periphery of the stamped parts.

It should be appreciated that the present invention can be utilized to make brake shoes for a wide variety of brake sizes and loads. By way of example, in a typical truck brake application, having a 16½ inch diameter, 7 inch deep drum, the web blank will be formed from 0.300 inch thick SAE 1035 steel and the table will be formed of 0.180 inch thick SAE 1008 steel. As illustrated in FIG. 7, a typical tab projection 32 will have a length L of approximately 0.500 inches and a width W corresponding to the thickness of the steel. The corresponding aperture 46 and the table member 24 will be slightly larger than the aperture to provide installation clearance. A clearance of 0.010 inches per side is adequate, however, this dimension is not critical.

The web and table member when assembled temporarily are located in a fixture (not shown). with the web and table held in the fixture, the plurality of the corresponding tabs and apertures are joined together in order to form a permanent attachment. Preferably, all of the welded tabs are joined together, however, in some applications it may be necessary only to join a limited number of the corresponding tabs and apertures.

In the embodiment of the invention as illustrated in FIGS. 7 and 8, the tab and aperture are joined by a weldment. In FIG. 8, a weld nugget 50 securely joins the web 22 and table 24. The area weld nugget 50 is quite localized and, as a result, does not cause warping or distortion of the table and web blank. Weld nugget 50 is formed by a concentrated energy source such as a plasma or a laser beam directed at the tab and immediately surrounding table material from an energy source 52 located outward of the semi-cylindrical table outer periphery 48.

With the welds completed, the bare brake shoe assembly is finished. There is no need for post-welding processing of the outer semi-cylindrical surface or of the first and second ends of the web which cooperate with the support plate and brake actuator mechanism. At this time, the bare brake shoe can either be sold as is or assembled with friction material to form a completed ready-to-use brake shoe assembly. In such case, the bare brake shoe is first coated with a layer of anti-corrosive material. The layer of friction material 26 is affixed to the outer semi-cylindrical surface of table 24 by any currently available method. With the friction material attached, the brake shoe assembly is ready for installation in a motor vehicle.

Figure 10:
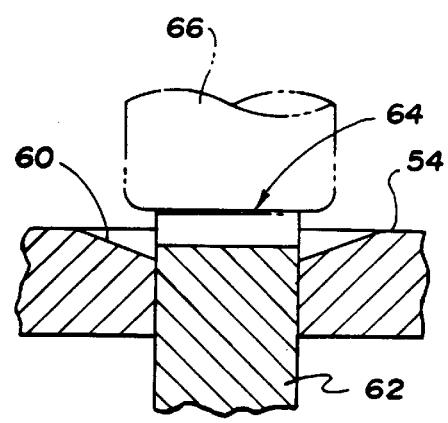
FIG. 10 is a cross-sectional end view taken alone line 10—10 of FIG. 9 with a staking punch shown in phantom outline.
Figure 11:
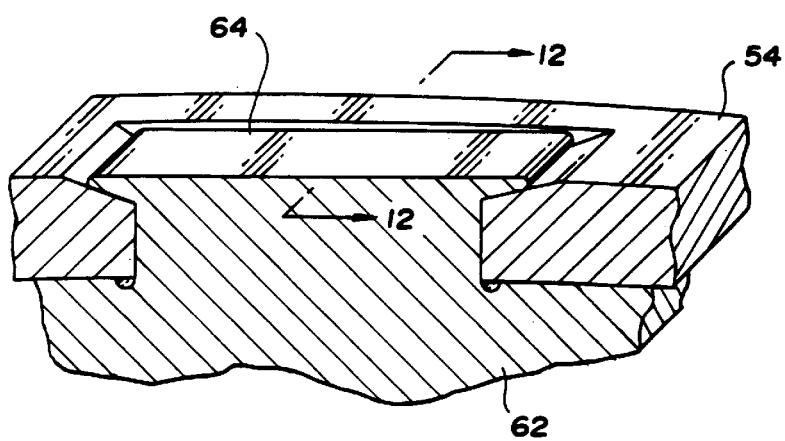
FIG. 11 is an enlarged cross-sectional view of an associated tab and table aperture which have been staked together.
Figure 12:
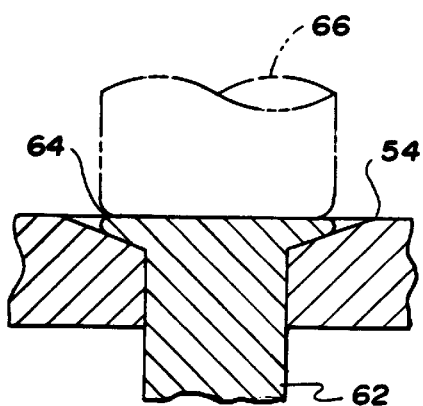
FIG. 12 is a cross-sectional end view taken alone line 12—12 of FIG. 11.
Figure 13:
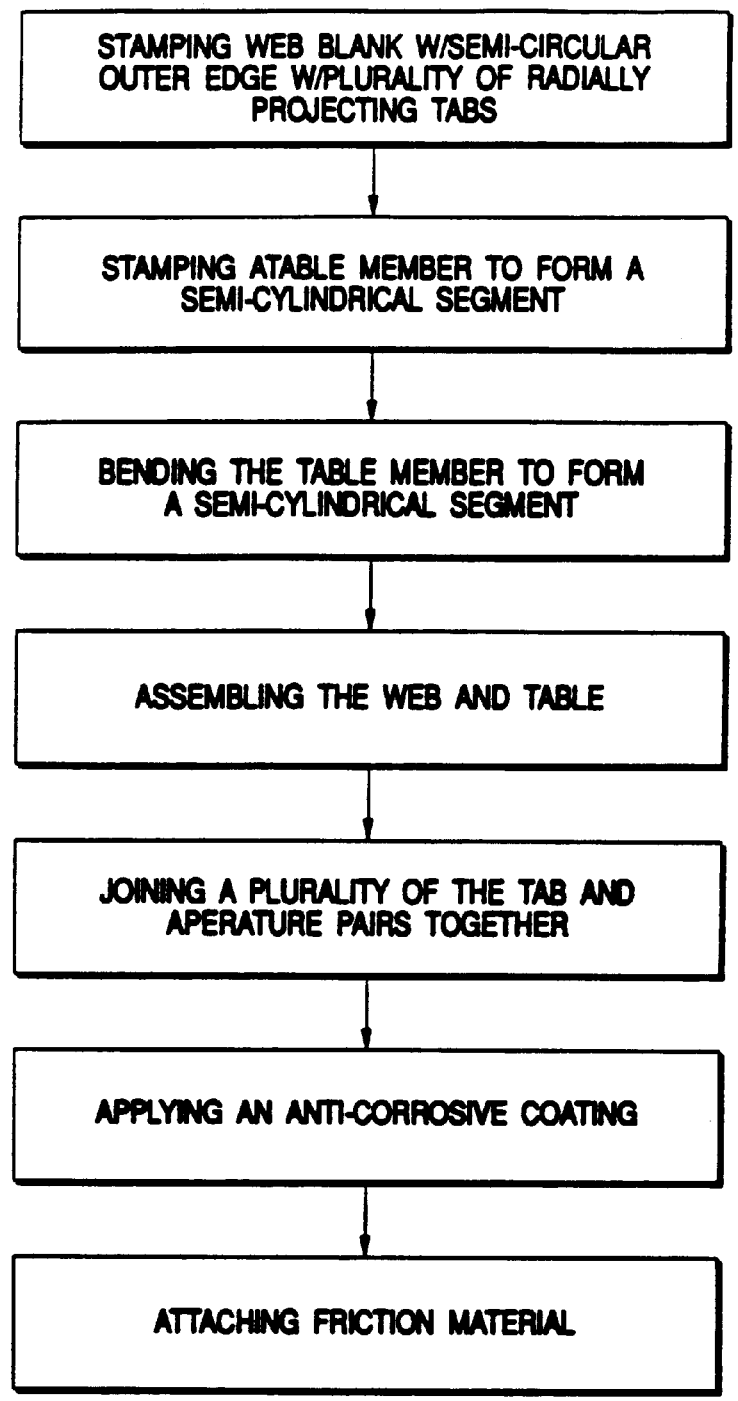
FIG. 13 is a block diagram setting forth the steps associated with manufacturing a completed brake shoe upon which friction material has been installed.

An alternative embodiment of the invention is illustrated in FIGS. 9–12. In this embodiment, table 54 is provided with aperture 56 having chamfered ends 58 and chamfered sides 60 as illustrated in FIGS. 9 and 10. Web blank 62 is provided with a tab 64 which is similar to tab 32 shown in FIG. 7 except for the increase in height. Tab 34 has a height H which exceeds the thickness T of table member 54. When the web and table are temporarily assembled together as illustrated in FIGS. 9 and 10, the free end of tab 64 will project above the outer cylindrical surface of table end 54 as illustrated. With the table and web temporarily attached together and located in a fixture, hot stake ram 66 shown in FIG. 10 will move into contact with the free end of tab 64 and begin to heat the tab. When the tab has reached the desired hot forming temperature, the hot stake ram will be extended to the position shown in FIG. 12 causing the end of the aperture to mushroom outward and to become substantially flush or possibly slightly recessed relative to the outer cylindrical surface of table 54. The resulting joint, shown in FIG. 11, forms a secure bond interlocking the tab 64 and the table 54 without causing resulting defamation or warpage of the table and web member. The resulting jointed parts form a bare brake shoe assembly which, like the brake shoe assembly described previously, can be sold as is or provided with a layer of friction material and an anti-corrosive coating.

It is also understood, of course, that while the form of the invention herein shown and described constitutes a preferred embodiment of the invention, it is not intended to illustrate all possible forms thereof. It should also be understood that the words used in the specification are words of description rather than limitation and various changes may be made without departing from the spirit and scope of the invention.

What is claimed is:

1. A method of forming a brake shoe assembly said method comprising:

precision stamping a substantially net shaped web blank having a semi-circular outer peripheral edge provided with a plurality of tabs projecting radially outward therefrom;

precision stamping a table member having a plurality of apertures formed therein corresponding in spacing to the tabs on the web blank;

bending the table member to form a semi-cylindrical segment;

assembling the web and table causing the web tabs and table apertures to interlock, locating the parts temporarily together; and joining a plurality of the corresponding tabs and apertures together using a hot staking process wherein the resulting joints do not extend substantially beyond an outer semi-cylindrical surface of the table, said hot staking process comprising the steps of moving a hot ram into contact with a free end of said tab thereby heating said tab, allowing said tab to achieve a desired hot forming temperature and then extending said ram toward said table member thereby causing said free end of said tab to deform outward thereby interlocking said tab and said table member.

2. The method of claim 1 further comprising:

applying an anti-corrosive coating to the assembly; and attaching friction material to the outer semi-cylindrical surface of the table to form a completed brake shoe assembly without the need for post joining machining.

3. The method of claim 1 wherein said step of joining further comprises staking a plurality of the tabs utilizing a staking tool oriented radially outboard of the outer periphery of the table to cause the tabs to deform expanding relative to the associated aperture in the table member securely mechanically interlocking the web blank and table member together.

4. The method of cl aim 3 wherein said step of staking a plurality of tabs further comprising heating the web blank tabs prior to mechanically deforming the tab projection.

5. The method of claim 1 wherein said step of precision stamping said table member further comprises forming opposing chamfered ends and opposing chamfered sides in said aperture and said hot staking process deforms said tab to expand and engage said chamfered sides and said chamfered ends thereby forming a secure bond interlocking said tab and said table.

6. The method of claim 1, wherein said step of precision stamping said web blank includes forming said tabs having a height which exceeds a thickness of said table manner, said step of assembling said web and table positions said free end of said tabs to extend through said corresponding apertures beyond said outer semi-cylindrical surface, said hot staking process deforming said tab such that said free end is one of substantially flush and slightly recessed relative to said outer semi-cylindrical surface.

* * * * *